(No Model.)

J. W. WEST.
HARROW.

No. 349,548. Patented Sept. 21, 1886.

Witnesses
Percy White
Chas. D. Davis

Inventor
James W. West
By his Attorney
C. M. Alexander

N. PETERS, Photo-Lithographer, Washington, D. C.

UNITED STATES PATENT OFFICE.

JAMES W. WEST, OF BRUCE, ILLINOIS.

HARROW.

SPECIFICATION forming part of Letters Patent No. 349,548, dated September 21, 1886.

Application filed February 25, 1886. Serial No. 193,103. (No model.)

*To all whom it may concern:*

Be it known that I, JAMES W. WEST, a citizen of the United States, residing at Bruce, in the county of Moultrie and State of Illinois, have invented certain new and useful Improvements in Harrows, of which the following is a specification, reference being had therein to the accompanying drawings.

This invention relates to certain improvements in harrows; and it has for its objects to provide for conveniently arranging the parts, so that they may be readily arranged for use or elevated and placed above the surface of the ground upon wheels for road travel, for the purpose of transportation from place to place, as more fully hereinafter specified. These objects I attain by the means illustrated in the accompanying drawings, in which—

Figure 1:
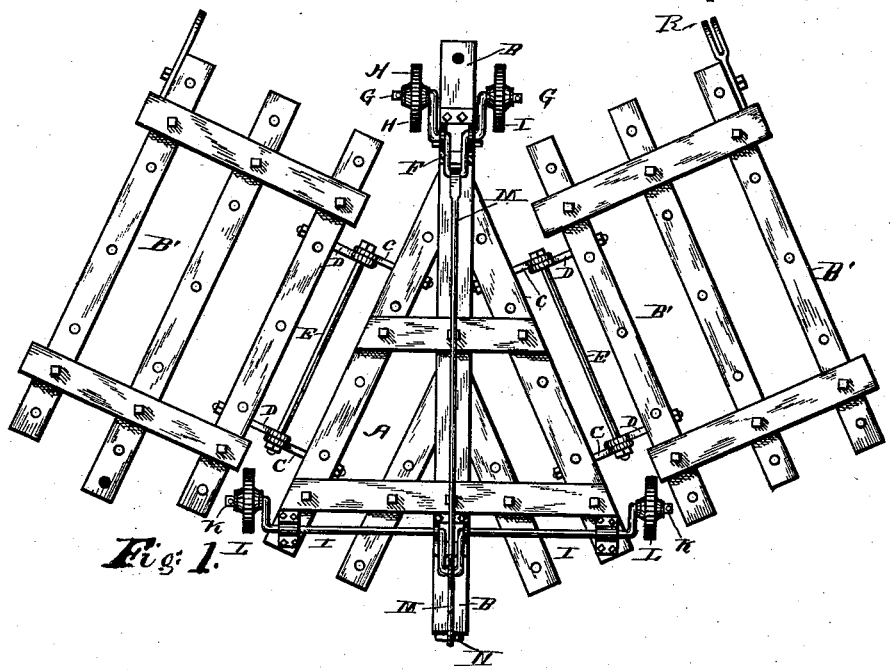
Figure 2:
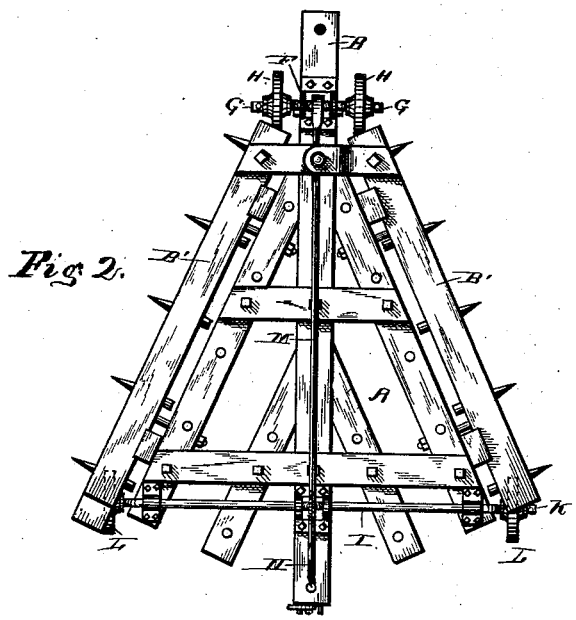

Figure 1 represents a top view of my improved harrow with the sections in position for work, and Fig. 2 a similar view showing the side sections elevated and the central section raised upon the wheels for road travel.

In the drawings, the letter A indicates a central harrow-section, consisting of a triangular harrow-frame having the usual harrow-teeth on the under side. This frame has a central beam, B, to the forward end of which is secured the clevis for the attachment of the draft-animals. From each side of the triangular frame extend eyebolts C, as clearly shown in Fig. 1 of the drawings.

The letter B' indicates two side sections, which consist of rectangular frames provided with the usual harrow-teeth. These sections have at one side eyebolts D, similar to the eyebolts C, and so spaced as to set between said eyebolts C, to which they are attached pivotally by a pintle-rod, E, thus connecting the three sections together.

The letter F indicates a bifurcated lever fulcrumed near the forward end of the central beam of the triangular section of the harrow, the lower arms straddling said beam, and having lateral spindles G, upon which are mounted the wheels H. At the rear of the said triangular section is secured a lever, I, having laterally-extended arms, which are fulcrumed to the frame, as indicated. The outer ends of said lever straddle the frame, and are provided with spindles K, upon which are mounted the wheels L. The upper arms of said levers are connected by means of a rod, M, which extends to the rear, and is provided with a handle, N, by which the levers may be operated simultaneously to raise or lower the central frame.

When the harrow is in position for operation, the side sections are let down, as shown in Fig. 1 of the drawings. When in position for road travel, the side sections are swung up and fastened by connections P R at the forward end. These connections are pivoted to the side beams of the outer sections of the harrow, and are so arranged that their inner or disconnecting ends will fall under the cross or transverse beams of the side sections when such sections are down, and be held thereby so as to be out of the way. The rod M is then pushed forward so as to elevate the central section upon the wheels, to permit the harrow to be put upon the road for transportation. By detaching the side sections from the central sections and connecting said sections by means of their eyebolts and one of the pintle-rods, a light flexible harrow may be produced.

Having thus described my invention, what I claim as my invention, and desire to secure by Letters Patent, is—

The combination, with the side sections of a harrow, hinged to a central section so as to swing together at their forward ends, of the connecting-fastenings pivoted to the respective sections at said forward ends, and the cross-beams, whereby said connections are held and supported when the side sections are down, substantially as specified.

In testimony whereof I affix my signature in presence of two witnesses.

JAMES W. WEST.

Witnesses:
JNO. W. MOBERLEY,
H. R. MOBERLEY.